(12) United States Patent  (10) Patent No.: US 8,429,649 B1
Feathergill et al.  (45) Date of Patent: Apr. 23, 2013

(54) SYSTEMS AND METHODS FOR DATA MANAGEMENT IN A VIRTUAL COMPUTING ENVIRONMENT

(75) Inventors: David Allen Feathergill, Woodstock, IL (US); Dimitry Kherson, Wilmette, IL (US)

(73) Assignee: Quest Software, Inc., Aliso Viejo, CA (US)

( * ) Notice: Subject to any disclaimer, the term of this patent is extended or adjusted under 35 U.S.C. 154(b) by 321 days.

(21) Appl. No.: 12/566,231

(22) Filed: Sep. 24, 2009

Related U.S. Application Data (60) Provisional application No. 61/100,182, filed on Sep. 25, 2008.

(51) Int. Cl.
 *G06F 9/455* (2006.01)
(52) U.S. Cl.
 USPC .............................................. 718/1; 718/100
(58) Field of Classification Search .................. None
 See application file for complete search history.

(56) References Cited

U.S. PATENT DOCUMENTS

| | | | |
|---|---|---|---|
| 4,130,867 A | 12/1978 | Bachman et al. |
| 4,648,031 A | 3/1987 | Jenner |
| 4,665,520 A | 5/1987 | Strom et al. |
| 5,222,235 A | 6/1993 | Hintz et al. |
| 5,297,279 A | 3/1994 | Bannon et al. |
| 5,325,505 A | 6/1994 | Hoffecker et al. |
| 5,333,314 A | 7/1994 | Masai et al. |
| 5,414,650 A | 5/1995 | Hekhuis |
| 5,422,979 A | 6/1995 | Eichfeld et al. |
| 5,423,037 A | 6/1995 | Hvasshovd |
| 5,455,945 A | 10/1995 | VanderDrift |
| 5,530,855 A | 6/1996 | Satoh et al. |
| 5,551,020 A | 8/1996 | Flax et al. |
| 5,553,303 A | 9/1996 | Hayashi et al. |
| 5,596,747 A | 1/1997 | Katabami et al. |
| 5,634,052 A | 5/1997 | Morris |
| 5,640,561 A | 6/1997 | Satoh et al. |
| 5,655,081 A | 8/1997 | Bonnell et al. |
| 5,664,186 A | 9/1997 | Bennett |
| 5,721,915 A | 2/1998 | Sockut et al. |
| 5,758,356 A | 5/1998 | Hara et al. |
| 5,761,667 A | 6/1998 | Koeppen |

(Continued)

OTHER PUBLICATIONS

"Data Deduplication Deep Dive, How to Put Data Storage on a Diet", InfoWorld, Mar. 2010, in 5 pages.

(Continued)

*Primary Examiner* — Emerson Puente
*Assistant Examiner* — Dong Kim
(74) *Attorney, Agent, or Firm* — Winstead PC (57) ABSTRACT

Systems and methods are disclosed for performing operations on a host system with one or more virtual machines without persistently storing an agent or daemon thereon. In certain examples, a management server is configured to inject dependencies, such as binary data, over a network to the host system for performing a requested operation. For instance, systems and methods can establish a secure shell (SSH) port forwarding connection through which dependencies stored on the management server are injected into a service console of the host system. The injected dependencies can then be executed and/or used to perform the requested operation, such as a backup or compression operation on virtual machine data. Once the requested operation has completed, the injected binaries are preferably removed from the host system so as to conserve system resources.

13 Claims, 3 Drawing Sheets

U.S. PATENT DOCUMENTS

| | | | |
|---|---|---|---|
| 5,761,677 A | 6/1998 | Senator et al. | |
| 5,774,717 A | 6/1998 | Porcaro | |
| 5,778,377 A | 7/1998 | Marlin et al. | |
| 5,778,392 A | 7/1998 | Stockman et al. | |
| 5,796,934 A | 8/1998 | Bhanot et al. | |
| 5,799,322 A | 8/1998 | Mosher, Jr. | |
| 5,822,780 A | 10/1998 | Schutzman | |
| 5,848,416 A | 12/1998 | Tikkanen | |
| 5,893,924 A | 4/1999 | Vakkalagadda | |
| 5,933,818 A | 8/1999 | Kasravi et al. | |
| 5,933,820 A | 8/1999 | Beier et al. | |
| 5,940,832 A | 8/1999 | Hamada et al. | |
| 5,943,677 A | 8/1999 | Hicks | |
| 5,948,108 A | 9/1999 | Lu et al. | |
| 5,951,694 A | 9/1999 | Choquier et al. | |
| 5,951,695 A | 9/1999 | Kolovson | |
| 5,956,489 A | 9/1999 | San Andres et al. | |
| 5,956,504 A | 9/1999 | Jagadish et al. | |
| 5,978,594 A | 11/1999 | Bonnell et al. | |
| 5,983,239 A | 11/1999 | Cannon | |
| 5,990,810 A | 11/1999 | Williams | |
| 5,991,761 A | 11/1999 | Mahoney et al. | |
| 5,995,958 A | 11/1999 | Xu | |
| 6,003,022 A | 12/1999 | Eberhard et al. | |
| 6,016,497 A | 1/2000 | Suver | |
| 6,026,412 A | 2/2000 | Sockut et al. | |
| 6,029,195 A | 2/2000 | Herz | |
| 6,067,410 A | 5/2000 | Nachenberg | |
| 6,067,545 A | 5/2000 | Wolff | |
| 6,070,170 A | 5/2000 | Friske et al. | |
| 6,119,128 A | 9/2000 | Courter et al. | |
| 6,122,640 A | 9/2000 | Pereira | |
| 6,151,607 A | 11/2000 | Lomet | |
| 6,157,932 A | 12/2000 | Klein et al. | |
| 6,185,699 B1 | 2/2001 | Haderle et al. | |
| 6,243,715 B1 | 6/2001 | Bogantz et al. | |
| 6,253,212 B1 | 6/2001 | Loaiza et al. | |
| 6,289,357 B1 | 9/2001 | Parker | |
| 6,314,421 B1 | 11/2001 | Sharnoff et al. | |
| 6,343,296 B1 | 1/2002 | Lakhamraju et al. | |
| 6,363,387 B1 | 3/2002 | Ponnekanti et al. | |
| 6,411,964 B1 | 6/2002 | Iyer et al. | |
| 6,460,048 B1 | 10/2002 | Teng et al. | |
| 6,470,344 B1 | 10/2002 | Kothuri et al. | |
| 6,477,535 B1 | 11/2002 | Mirzadeh | |
| 6,499,039 B1 | 12/2002 | Venkatesh et al. | |
| 6,519,613 B1 | 2/2003 | Friske et al. | |
| 6,523,035 B1 | 2/2003 | Fleming et al. | |
| 6,584,474 B1 | 6/2003 | Pereira | |
| 6,606,626 B1 | 8/2003 | Ponnekanti | |
| 6,631,478 B1 | 10/2003 | Wang et al. | |
| 6,671,721 B1 | 12/2003 | Branson et al. | |
| 6,681,386 B1* | 1/2004 | Amin et al. | 717/136 |
| 6,691,139 B2 | 2/2004 | Ganesh et al. | |
| 6,721,742 B1 | 4/2004 | Uceda-Sosa et al. | |
| 6,728,780 B1 | 4/2004 | Hebert | |
| 6,834,290 B1 | 12/2004 | Pugh et al. | |
| 6,859,889 B2 | 2/2005 | Matsuura et al. | |
| 6,907,512 B2 | 6/2005 | Hill et al. | |
| 6,950,834 B2 | 9/2005 | Huras et al. | |
| 6,959,441 B2 | 10/2005 | Moore | |
| 7,065,538 B2 | 6/2006 | Aronoff et al. | |
| 7,085,900 B2 | 8/2006 | Inagaki et al. | |
| 7,093,086 B1 | 8/2006 | van Rietschote | |
| 7,340,486 B1 | 3/2008 | Chapman | |
| 7,370,164 B1 | 5/2008 | Nagarkar et al. | |
| 7,447,854 B1 | 11/2008 | Cannon | |
| 7,461,103 B2 | 12/2008 | Aronoff et al. | |
| 7,546,325 B2 | 6/2009 | Kamei et al. | |
| 7,610,331 B1 | 10/2009 | Genske et al. | |
| 7,657,581 B2 | 2/2010 | Orenstein et al. | |
| 7,669,020 B1 | 2/2010 | Shah et al. | |
| 7,707,185 B1 | 4/2010 | Czezatke et al. | |
| 7,752,487 B1 | 7/2010 | Feeser et al. | |
| 7,765,400 B2 | 7/2010 | Costea et al. | |
| 7,805,423 B1 | 9/2010 | Romine et al. | |
| 7,844,577 B2 | 11/2010 | Becker et al. | |
| 7,849,267 B2 | 12/2010 | Lam et al. | |
| 7,895,161 B2 | 2/2011 | Sugimoto et al. | |
| 7,925,850 B1 | 4/2011 | Waldspurger et al. | |
| 8,010,495 B1 | 8/2011 | Kuznetzov et al. | |
| 8,046,550 B2 | 10/2011 | Feathergill | |
| 8,060,476 B1 | 11/2011 | Afonso et al. | |
| 8,135,930 B1 | 3/2012 | Mattox et al. | |
| 8,166,265 B1 | 4/2012 | Feathergill | |
| 8,286,019 B2 | 10/2012 | Murase | |
| 8,335,902 B1 | 12/2012 | Feathergill | |
| 2003/0145074 A1* | 7/2003 | Penick | 709/223 |
| 2004/0236803 A1 | 11/2004 | Spiegeleer | |
| 2005/0114614 A1 | 5/2005 | Anderson et al. | |
| 2005/0278280 A1* | 12/2005 | Semerdzhiev et al. | 707/1 |
| 2006/0005189 A1 | 1/2006 | Vega et al. | |
| 2006/0020932 A1 | 1/2006 | Bentz et al. | |
| 2006/0155735 A1 | 7/2006 | Traut et al. | |
| 2006/0218544 A1 | 9/2006 | Chakraborty et al. | |
| 2007/0208918 A1 | 9/2007 | Harbin et al. | |
| 2007/0234334 A1 | 10/2007 | Araujo, Jr. et al. | |
| 2007/0244938 A1* | 10/2007 | Michael et al. | 707/204 |
| 2008/0082593 A1 | 4/2008 | Komarov et al. | |
| 2008/0155208 A1* | 6/2008 | Hiltgen et al. | 711/154 |
| 2008/0177994 A1 | 7/2008 | Mayer | |
| 2008/0201414 A1 | 8/2008 | Amir Husain et al. | |
| 2008/0244028 A1* | 10/2008 | Le et al. | 709/208 |
| 2008/0244577 A1* | 10/2008 | Le et al. | 718/1 |
| 2008/0250406 A1 | 10/2008 | Carpenter et al. | |
| 2009/0007100 A1 | 1/2009 | Field et al. | |
| 2009/0089781 A1 | 4/2009 | Shingai et al. | |
| 2009/0158432 A1 | 6/2009 | Zheng et al. | |
| 2009/0216816 A1 | 8/2009 | Basler et al. | |
| 2009/0216970 A1 | 8/2009 | Basler et al. | |
| 2010/0030983 A1* | 2/2010 | Gupta et al. | 711/162 |
| 2010/0049930 A1 | 2/2010 | Pershin et al. | |
| 2010/0058013 A1 | 3/2010 | Gelson et al. | |
| 2010/0070725 A1 | 3/2010 | Prahlad et al. | |
| 2010/0076934 A1 | 3/2010 | Pershin et al. | |
| 2010/0077165 A1 | 3/2010 | Lu et al. | |
| 2010/0088277 A1 | 4/2010 | Rao et al. | |
| 2010/0115332 A1 | 5/2010 | Zheng et al. | |
| 2010/0122248 A1 | 5/2010 | Robinson et al. | |
| 2010/0228913 A1 | 9/2010 | Czezatke et al. | |
| 2010/0235813 A1 | 9/2010 | Manczak et al. | |
| 2010/0235831 A1 | 9/2010 | Dittmer | |
| 2010/0257331 A1 | 10/2010 | Frank | |
| 2010/0262585 A1 | 10/2010 | Rosikiewicz et al. | |
| 2010/0262586 A1 | 10/2010 | Rosikiewicz et al. | |
| 2011/0035358 A1 | 2/2011 | Naik | |
| 2011/0047340 A1 | 2/2011 | Olson et al. | |
| 2011/0145199 A1 | 6/2011 | Palagummi | |
| 2011/0153697 A1 | 6/2011 | Nickolov et al. | |
| 2011/0154325 A1* | 6/2011 | Terasaki | 718/1 |
| 2012/0297246 A1 | 11/2012 | Liu et al. | |

OTHER PUBLICATIONS

"The What, How and Where of Deduplication", Spectra nTier with FalconStor Deduplication, Spectra Logic Corporation, May 2008, in 12 pages.

"Quest SharePlex for Oracle," Brochure, Quest Software, Inc., Nov. 1999, 4 pages.

Space Management and Reorganization: Challenges and Solutions, http://quest.com/whitepapers/space_manager_wp.doc, published on or around Dec. 21, 1999.

"Top Five Tips for Space Management and Reorganization," believed to be published after Jul. 21, 1998, in 2 pages.

Computer Associates, "Platinum OnlineReorg Technical Overview, OnlineReorg", http://platinum.com/products/custstor/tsreorg.htm, 5 pages downloaded on Nov. 30, 1999.

Computer Associates, "Platinum Tsreorg Automates Tablespace Reorganizations, Customer Story", http://platinum.com/products/custstor/tsreorg.htm, 2 pages downloaded on Nov. 30, 1999.

Computer Associates, "ProVision Tsreorg for Oracle, Brochure, Database Utilities Tsreorg for Oracle", http://platinum.com/products/custstor/tsreorg.htm, 4 pages downloaded on Nov. 30, 1999.

Computer Associates, "Rapid Reorg for DB2 for OS/390, Brochure", http://platinum.com/products/custstor/tsreorg.htm, 3 pages downloaded on Nov. 30, 1999.

EMC Deduplication Frequently Asked Questions, http://www.datadomain.com/resources/faq.html, downloaded Jun. 7, 2011, 4 pages.

Harley Stagner, Aligning disk partitions to boost virtual machine performance, Vmware Management, Migration and Performance, http://searchvmware.techtarget.com/tip/0,289483,sid179_gci1344730_mem1,00.html, Jan. 28, 2009, pp. 1-5.

Jeff Graves, "Partition Alignment", ORCS Web Team Blog, http://www.orcsweb.com/blog, Sep. 14, 2009, pp. 1-2.

Jin, Keren et al.,"The Effectiveness of Deduplication on Virtual Machine Disk Images", SYSTOR 2009, May 2009, in 12 pages.

John Willemse, "VMware disk alignment VMDK settings and align at the 64k boundary blogSphere bug desktop enterprise microsoft server vist . . . ", Planet Lotus, http://planetlotus.org/profiles/john-willemse_49586, Apr. 30, 2009, pp. 1-5 (of 44).

Joseph Pagano, paper on Microsoft Exchange Disaster Recovery Planning, document version 3.00, 1996, in 39 pages.

K. Loney, et al., "Oracle8i, DB Handbook," Oracle Press, 2000, p. 20.

L. Leverenz, et al., "Oracle8i Concepts," Oracle Corp., vol. 2, Release 8.1.5, 1999, p. 20-3.

Massiglia, Paul, "Block-Level Incremental Backup", VERITAS Software Corporation, Feb. 2000, in 13 pages.

Oracle: Introduction to PL/SQL, Power Point Presentation Regarding Triggers, slides 4, 6-7, 11, 14-17, 28, and 51, http://training.ntsource.com/dpec/COURSES/PL1/plc011.htm, 10 pages downloaded on Oct. 20, 2000.

Tom Hirt, "Importance of Disk Alignment in VMware", VMware Disk Alignment—How-to Align VMware Partitions—Disk, Alignment, Vmfs, Vmdk, Esx, Apr. 9, 2009, pp. 1-15.

VMWARE, "Recommendations for Aligning VMFS Partitions", VMware Infrastructure 3, VMware Performance Study, Feb. 2009, pp. 1-10.

VMWARE, Inc., "VMware Virtual Machine File System: Technical Overview and Best Practices", A VMware Technical White Paper, http://www.vmware.com/support/, 2007, Issue Version 1.0, pp. 1-19.

Laverick, Mike, "VMware ESX 3.x Server and VirtualCenter 2.x (GA Build Eval) Service Console Guide," Document Ver. 1.2, RTFM Education, downloaded Dec. 17, 2008, in 73 pages.

Kleo Bare Metal Backup, Wikipedia, retrieved from http://en.wikipedia.org/wiki/Kleo_Bare_Metal_Backup on Apr. 14, 2010, in 3 pages.

Veritas NetBackup for VMware Adminstrator's Guide, UNIX, Windows, and Linux, Release 6.5.4, Symantec Corporation, 2009, in 66 pages.

Data Sheet: Data Protection, "Symantec NetBackup 7, The Symantec NetBackup Platform: Complete protection for your information-driven enterprise," Symantec Corporation, Dec. 2009, in 8 pages.

Veeam Technology Overview, "The New Standard for Data Protection," Veeam Software, Apr. 2010, in 2 pages.

Backup Critic, "File Versus Image Backups," retrieved from http://www.backupcritic.com/software-buyer/file-verus-image on May 4, 2010, in 3 pages.

Microsoft TechNet, Windows Server 2003, retrieved from http://technet.microsoft.com/en-us/library/cc706993(WS.10,printer).aspx on Aug. 3, 2011, in 6 pages.

MSDN, Overview of Processing a Backup Under VSS, retrieved from http://msdn.microsoft.com/en-us/library/aa384589(d=printer,v=VS.85).aspx on Aug. 3, 2011, in 5 pages.

Armstrong, Ben, "How Do I Fix a Corrupted Virtual Hard Disk?", Virtual PC Guy's Blog, Jan. 7, 2009, in 4 pages.

Microsoft Corporation Technet, "Compacting Dynamically Expanding Virtual Hard Disks", retrieved Feb. 6, 2012, in 2 pages.

Microsoft Corporation Technet, "To Compact a Dynamically Expanding Virtual Hard Disk", retrieved Feb. 6, 2012, in 1 page.

Microsoft Corporation, "Microsoft Windows XP—Compact", Command-line reference A-Z, retrieved Feb. 6, 2012, in 2 pages.

Naik, Dilip, "Virtual Machine Storage—often overlooked optimizations", 2010 Storage Developer Conference, Storage Networking Industry Association, Sep. 2010, in 21 pages.

Russinovich, Mark, "SDelete v1.6", Windows Sysinternals, published Sep. 1, 2011, in 3 pages.

U.S. Appl. No. 09/713,479, filed Nov. 15, 2000, Romine et al.
U.S. Appl. No. 12/566,231, filed Sep. 24, 2009, Feathergill et al.
U.S. Appl. No. 12/762,162, filed Apr. 16, 2010, Mattox.
U.S. Appl. No. 13/156,199, filed Jun. 8, 2011, Feathergill et al.
U.S. Appl. No. 13/218,362, filed Aug. 25, 2011, Feathergill et al.
U.S. Appl. No. 13/244,187, filed Sep. 23, 2011, Afonso et al.
U.S. Appl. No. 13/448,010, filed Apr. 16, 2012, Feathergill.
Afonso, Delano Xavier, U.S. Appl. No. 13/764,011, filed Feb. 11, 2013.

* cited by examiner

SYSTEMS AND METHODS FOR DATA MANAGEMENT IN A VIRTUAL COMPUTING ENVIRONMENT

RELATED APPLICATION

This application claims the benefit of priority under 35 U.S.C. §119(e) of U.S. Provisional Patent Application No. 61/100,182, filed Sep. 25, 2008, which is hereby incorporated herein by reference in its entirety to be considered part of this specification.

BACKGROUND

1. Field of the Invention

Embodiments of the invention generally relate to managing data in a virtual computing environment and, in particular, to executing tasks on one or more virtual machines systems.

2. Description of the Related Art

Many companies take advantage of virtualization solutions to consolidate several specialized physical servers and workstations into fewer servers running virtual machines. Each virtual machine can be configured with its own set of virtual hardware (e.g., processor, memory, ports, and the like) such that specialized services that each of the previous physical machines performed can be run in their native operating system. In particular, a virtualization layer, or hypervisor, allocates the computing resources of one or more host servers to one or more virtual machines and further provides for isolation between such virtual machines. In such a manner, the virtual machine is a representation of a physical machine by software.

Certain host servers also include a service console that provides a management layer for the virtual machine(s) and/or functions as the operating system of the host server. The service console, however, generally has limited access to host system resources, such as processing time and memory, since such resources are generally allocated and reserved for use by the virtual machines and their respective hypervisors. For instance, certain service consoles may be limited to accessing a single processor, even if the host server includes multiple processors, and approximately 100 MB of memory (e.g., RAM).

To manage applications and execute tasks on the data of one or more virtual machine disks, many vendors install agents or daemons within the service console. These agents and daemons persistently reside on and/or are registered with the host server in order to perform their respective operations. However, because each virtual machine and/or hypervisor can be associated with its own set of agents, the combined load of the several agents can adversely impact the performance of the host server, such as by consuming valuable system resources (e.g., processing power and memory), even when the specific jobs of the agents are not being performed.

SUMMARY

Given the aforementioned issues and challenges, a need exists for improved systems and methods for managing data operations in a virtual computing environment, while also avoiding resource contention on a host server. For example, a need exists for systems and methods for performing agentless data operations from within a service console of the host server that do not require the executable files, binaries or like code to be persistently available on the host server. That is, there is a need for performing operations on virtual machine data and/or a hypervisor without using an agent, daemon or registered process on the host server.

In view of the foregoing, certain systems and methods disclosed herein are directed to improved data management operations in a virtual computing environment. Certain embodiments of the invention provide for dependency injection techniques that allow executables and associated data to be injected from a remote computing device to the service console of a host server in order to perform one or more requested tasks or jobs. Following completion of the task(s), the executables and associated data are removed from the host server. Moreover, because the disclosed systems and methods do not depend on executables residing on the host server, embodiments of the invention advantageously facilitate improved version control of the executed tasks and jobs.

In certain embodiments, session-based binary injection is utilized for select jobs or tasks (e.g., backup, replication, compression, encryption, antivirus, monitoring or the like) to be performed by the service console of a host system. A management server, which stores a library of binary files for such tasks, injects the appropriate binary files or code to the service counsel of the host computer via a secure shell (SSH) or other network protocol connection. A script file, such as a PYTHON script, on the host server is used to receive the injected binary files and to cause them to be executed on the host server. Moreover, in certain embodiments, a particular job can utilize multiple injected binaries that depend from each other, or are otherwise chained together, to perform the various portions of the job (e.g., compression and encryption in combination with a backup operation). Upon completion, the remote connection is terminated, and the binaries and their related data are removed from the host server, thereby conserving the host system resources.

In certain embodiments, the session-based binary injection process can be used in performing storage operations on virtual machine data. In particular, the process can account for executables not generally available on the host server (e.g., a differential engine, compression engine). Moreover, in certain embodiments, the binary injection process can be performed without registering the injected binary(ies) as a service on the host server.

In certain embodiments, a method is disclosed for performing one or more operations on virtual machine data. The method includes receiving with a management server a request to perform an operation on data of one or more virtual machines hosted by a host server, the host server being remote to the management server. The method also includes identifying a plurality of dependencies associated with the requested operation and injecting at least one of the plurality of dependencies over a port forwarding connection from the management server to a service console of the host server. In addition, the method comprises executing at least the injected at least one dependency to perform the requested operation on the virtual machine data, such that said executing is performed without installing an agent or a daemon in the service console of the host server and, following said executing, removing the injected at least one dependency from the service console of the host server.

In certain embodiments, a system is disclosed for performing one or more operations in a virtual computing environment. The system includes a management server in network communication with a remote server hosting at least one virtual machine, the management server having at least a library and an injection module. The library comprises a plurality of dependencies, the plurality of dependencies comprising at least one binary file. The injection module is configured to identify select ones of the plurality of dependencies that are associated with performing a requested operation on at least one of virtual machine data and a hypervisor layer, the injection module being further configured to: (i) initiate a communication session between the management server and the remote server, (ii) inject the selected ones of the plurality of dependencies over a network connection to the remote server, (iii) issue a first command to execute on the host server the injected selected ones of the plurality of dependencies to perform the requested operation, and (iv) issue a second command to terminate the session and to remove from the host server the injected selected ones of the plurality of dependencies such that none of the injected selected ones of the plurality of dependencies remains on the host server following said termination of the session.

In certain embodiments, a system is disclosed performing one or more operations on virtual machine data. The system comprises: means for receiving a request to perform a job on data of one or more virtual machines hosted by a host server, the host server being in network communication with said receiving means; means for identifying a plurality of dependencies associated with the requested job; means for injecting at least one of the plurality of dependencies over a network connection from said receiving means to an operating system of the host server; means for executing at least the at least one dependency to perform the requested job on the virtual machine data, such that said executing is performed without installing an agent or a daemon on the host server; and means for removing the at least one dependency from the host server immediately following completion of said executing.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENTS

Certain systems and methods disclosed herein are directed to performing dependency injection in a computing environment to execute tasks on virtual machine data and/or a hypervisor layer. For instance, certain embodiments of the invention provide for session-based binary injection that allows for the injection of binary files onto a host server such that the host server can perform one or more desired tasks without the use of an agent or daemon that remains on the host server. In certain embodiments, such binaries can be further configured to run in parallel and/or with additional dependencies, such as multiple, linked injected binaries that can be utilized to perform one or more related tasks.

The features of the inventive systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

In addition, methods and functions described herein are not limited to any particular sequence, and the blocks or states relating thereto can be performed in other sequences that are appropriate. For example, described blocks or states may be performed in an order other than that specifically disclosed, or multiple blocks or states may be combined in a single block or state.

For exemplary purposes, certain embodiments of the inventive systems and methods will be described herein with reference to VMWARE virtual infrastructures offered by VMware, Inc. (Palo Alto, Calif.). However, it will be understood from the disclosure herein that the disclosed systems and methods can be utilized with other virtualization technologies, including, but not limited to, virtual environments using XEN and XENSERVER by Citrix Systems, Inc. (Fort Lauderdale, Fla.), ORACLE VM by Oracle Corporation (Redwood City, Calif.), HYPER-V by Microsoft Corporation (Redmond, Wash.), VIRTUOZZO by Parallels, Inc. (Switzerland), or the like.

Figure 1:
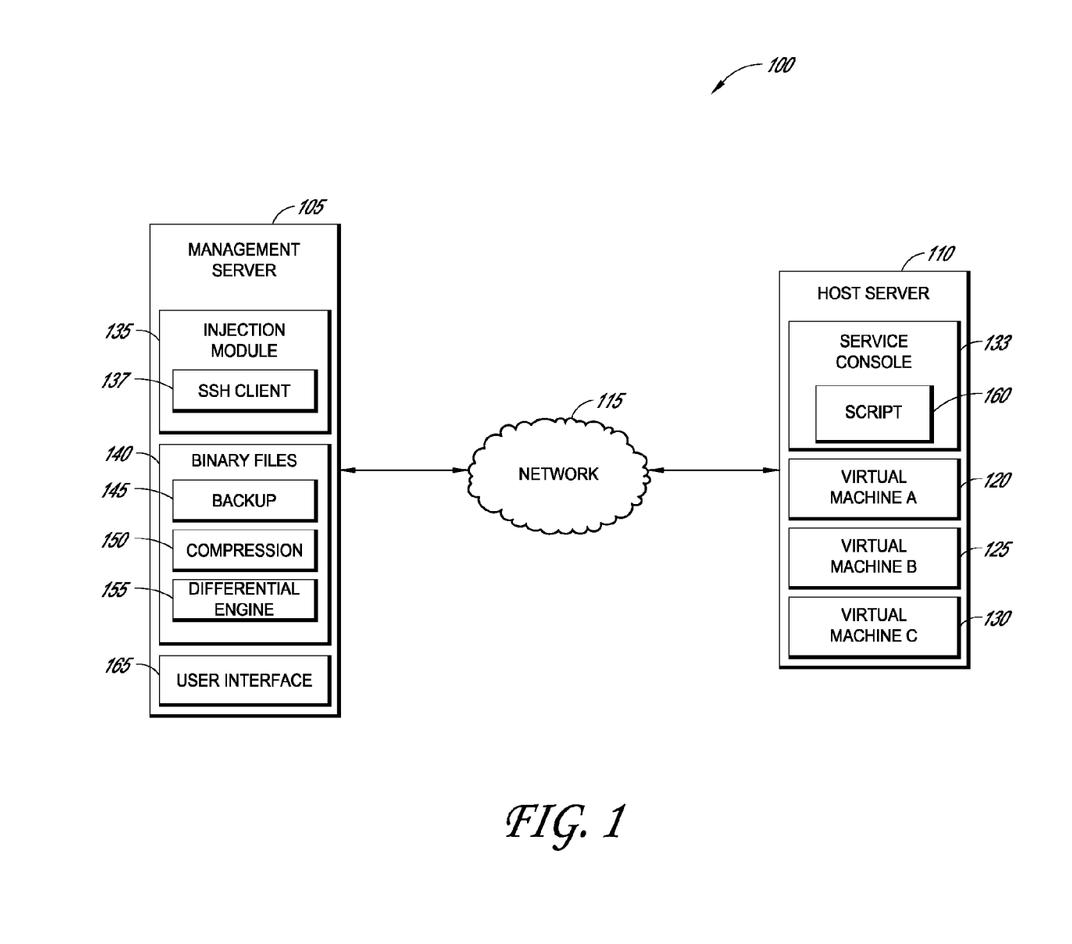
FIG. 1 illustrates an exemplary block diagram of a computing system for performing binary injection in a virtual computing environment, according to certain embodiments of the invention.

FIG. 1 illustrates an exemplary block diagram of a virtual computing system 100 for performing dependency injection, according to certain embodiments of the invention. In general, the virtual computing system 100 allows for the performance of tasks and/or jobs on virtual machine data and/or a hypervisor layer without requiring an agent or daemon to be installed on the host server or virtual machine. For instance, certain embodiments of the invention can be utilized to perform a variety of tasks and jobs, such as, for example, backup, compression, replication, comparison, encryption, virus protection, combinations of the same or the like.

As shown, the virtual computing system 100 comprises a management server 105 that communicates with a remote computing device, host server 110, through a network 115. In general, the management server 105 coordinates certain tasks, jobs and operations to be performed on data of one or more virtual machines. In certain embodiments, the management server 105 stores a plurality of executable files associated with the performance of such jobs or tasks and transfers such files over the network 115 to the host server 110 for execution on a temporary, as-needed basis.

In certain embodiments, the management server 105 comprises a WINDOWS-based server. For instance, the management server can comprise the VRANGER PRO backup tool or VREPLICATOR replication tool commercially available through Vizioncore, Inc. (Buffalo Grove, Ill.). Inventive injection processes disclosed herein can advantageously be used in connection with these tools, which are described in U.S. patent application Ser. No. 12/502,052, filed Jul. 13, 2009, and U.S. patent application Ser. No. 12/502,035, filed Jul. 13, 2009, each of which is hereby incorporated herein by reference in its entirety to be considered part of this specification. In yet other embodiments, the management server 105 can comprise multiple computing devices and/or storage devices.

In certain embodiments, the host server 110 comprises one or more computing devices configured to host one or more virtual machines executing above a hypervisor layer. Such abstraction by the hypervisor layer(s) allows, for example, for multiple virtual machines with heterogeneous operating systems and applications to run in isolation on resources of the same physical machine. For instance, the host server 110 can comprise a VMWARE ESX server or other like virtualization platform.

In yet other embodiments, the host server 110 can include a hosted architecture in which the hypervisor runs within a host operating system environment. In such embodiments, the hypervisor can rely on the host operating system for device support and/or physical resource management. Examples of such hosted hypervisors can include, but are not limited to, VMWARE WORKSTATION and VMWARE SERVER by VMware, Inc., VIRTUAL SERVER by Microsoft Corporation, PARALLELS WORKSTATION by Parallels, Inc., or the like.

As shown, the host server 110 hosts three virtual machines: virtual machine A 120, virtual machine B 125 and virtual machine C 130. Each of the virtual machines 120, 125 and 130 has access to data of one or more virtual machine disks and can manipulate, store, edit or otherwise perform operations on such data as would a general computer. Although three virtual machines are illustrated for exemplary purposes, it will be understood that the host server 110 can host more or fewer virtual machines depending upon the requirements of the virtual computing system 100.

The illustrated host server 110 further comprises a service console 133. In certain embodiments, the service console 133 comprises a management interface, or operating system, for the host server 110. For instance, the service console 133 can be configured to provide a boot layer for the hypervisor(s) and is configured to start up and/or administer each of the virtual machines 120, 125 and 130. In certain embodiments, the service console 133 can be advantageously accessed locally and/or remotely, such as via SSH, Telnet, or other suitable network protocol usable for remote communications. In certain examples, the service console 133 can be further managed by a user via a command line interface. In embodiments of the invention in which the host server 110 comprises an ESX server, the service console 133 can comprise a VMWARE LINUX-based service console.

As illustrated, the management server 105 further comprises an injection module 135 for transferring one or more dependencies, binary files, executables or like code for execution and/or use on the host server 110. For instance, as discussed in more detail below, the injection module 135 can be configured to initiate a remote connection with the host server 110. In certain embodiments, the injection module 135 can perform an upload operation of the dependency data, executables or the like, by establishing an SSH port forwarding connection between the management server 105 and the host server 110 (e.g., the VMWARE ESX service console).

Moreover, the management server 105 further includes an SSH client and/or adapter 137 with the injection module 135. In certain embodiments, the SSH client 137 can be configured to run a shell command line associated with the SSH connection in order to execute one or more commands on the remote host server 110. In certain embodiments, the shell command line provides a simple command-line interface (e.g., user interface 165) for limited management functions and for retrieving results of functions performed on the service console 133 of the host server 110.

For example, in certain embodiments, the SSH client 137 advantageously prepares data for transmission over the SSH connection. The SSH client 137, in certain embodiments, can, as part of a shell command, create new object-oriented (OO) objects that contain metadata regarding data to be injected over the SSH connection. For instance, the SSH client can abstract from a shell command in .NET code class definition attributes as part of the execution of a particular command. In yet other embodiments, the objects can contain the actual data for injection. In yet further embodiments, the SSH client 137 can comprise an SSH library for establishing communication between the management server 105 and the host server 110.

The management server 105 further comprises a dependency library 140 of data that can be injected from the management server 105 to the host server 110. In certain embodiments, the dependencies within the library 140 can be advantageously used to manipulate, read, copy and/or otherwise operate on virtual machine data.

Moreover, it will be understood from the disclosure herein that the management server 105 can be configured to store the dependency library 140 on one or more local or remote storage devices and/or computing devices. In such embodiments, the term "management server," as used herein, is intended to include such devices.

The term "dependency" as used herein is a broad term and is used in its ordinary sense and includes, without limitation, any data usable to perform one or more commands, tasks, operations and/or jobs. For example, a dependency can include one or more of the following: customized and/or conventional binary files, executable files, data files, script files, code, text files, libraries, payloads, configuration files, combinations of the same or the like.

For illustration purposes, the dependency library 140 has been shown with certain binary files usable in a backup operation. In particular, the library 140 includes a backup binary 145, a compression binary 150 and a differential engine binary 155. In certain embodiments, one or more of the binaries 145, 150 and 155 can be injected into the service console 133 of the host server 110 to perform a backup operation on data of one or more virtual machines. In yet other embodiments, the library 140 can include more recent versions of binaries or executables than the versions of such components resident on the host server 110.

In yet other embodiments, the library 140 can comprise data other than binary files. For instance, the library 140 can contain other libraries (e.g., dynamic link libraries (DLLs)), data files, configuration files, combinations of the same or the like for uploading from the management server 105 to the host server 110.

The service console 133 further includes a receiver for receiving the injected dependency data. As shown un FIG. 1, the receiver comprises a script 160 that can bind itself to a selected local port of the host server 110 to receive the dependency data. In certain embodiments, the script comprises a PYTHON or like script that is echoed over from the management server 105 prior to injection of the dependencies. In yet other embodiments, the receiver can comprise a network utility, such as the UNIX NETCAT utility for receiving the dependencies.

The user interface 165 of the management server 105, provides a module for receiving user input and/or providing information to the user. As discussed above, in certain embodiments, the user interface 165 can comprise a shell having a command-line interface. In yet other embodiments, the user interface 165 can comprise a graphical user interface.

The network 115 can comprise a local area network (LAN). In yet other embodiments, the network 115 can comprise one or more of the following communication means: internet, intranet, wide area network (WAN), public network, combinations of the same or the like. In addition, connectivity to the network 115 may be through, for example, remote modem, Ethernet, token ring, fiber distributed datalink interface (FDDI), asynchronous transfer mode (ATM), combinations of the same or the like.

Figure 2:
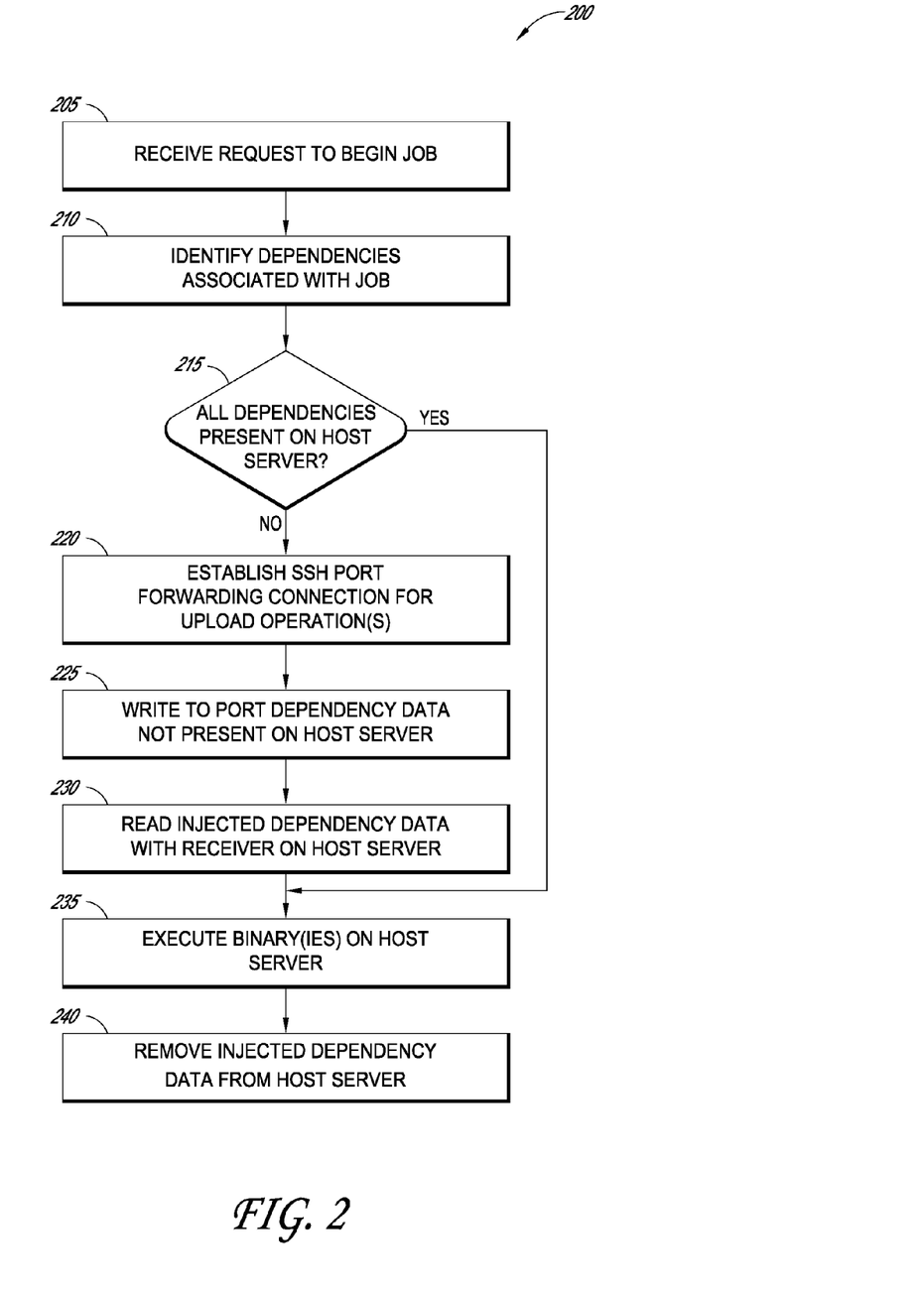
FIG. 2 illustrates a flowchart of an exemplary embodiment of a dependency injection process usable by the computing system of FIG. 1.

FIG. 2 illustrates a flowchart of an injection process 200, according to certain embodiments of the invention. For instance, the injection process 200 can be used when one or more dependencies for performing particular jobs, commands or tasks are not available on the service console of a host server. Embodiments of the injection process 200 advantageously upload the needed dependencies to the service console on an as-needed basis and do not require the installation of a daemon and/or agent within the service console. For exemplary purposes, the injection process 200 will be described hereinafter with reference to the components of the virtual computing system 100 of FIG. 1.

At Block 205, the management server 105 receives a job request. For instance, the request can be issued by a user to perform a backup or other copy operation on data of one or more virtual machines. In other embodiments, the request can be based on a predefined job schedule and/or can be dependent upon a call or request from another operation (e.g., a compression task being used within a backup operation). In yet other embodiments, the job request can be received by the service console 133 of the host server 110 from, for example, the management server 105, a user, a virtual machine or the like.

The term "job" as used herein is a broad term, and is used in its ordinary sense and includes, without limitation, a program application, operation or task that may comprise one or more steps but that is considered as a single logical unit. For instance, in certain embodiments, a single job can comprise multiple commands associated therewith, wherein each command can be related to one or more dependencies for performing a particular function.

At Block 210, the process 200 identifies each of the dependencies associated with the requested job. For instance, in certain embodiments, the process 200 determines which commands are associated with performing the job and the specific dependencies involved with such commands. For instance, the process 200 can identify binaries, data files, or the like that are needed to complete the requested job.

In certain embodiments, Block 210 can be performed by a dependency mapper (not shown) installed on the management server 105. In certain embodiments the dependency mapper comprises a module configured to parse a particular command and identify the dependencies that are associated with therewith.

At Block 215, the process 200 determines if the identified dependencies are available on the host server 110. For instance, the injection module 135 can determine the appropriate path environment variable of the host server 110 and issue a command to find a specific dependency within the particular path, such as via a whereis command. In certain embodiments, dependencies, such as select binary files, maintained on the host server 110 could be stored in a path for storing dependencies and/or binaries (e.g., /usr/local/bin/ on a UNIX-type system) as part of the service console 133.

In other embodiments, the service console 133 could access a registry or other data structure that lists the dependencies available on the host server 110. In yet other embodiments, the service console 133 can access designated path(s) or folder(s) to search for such dependencies.

If any of the required dependencies are not present on the host server 110, the injection module 135 establishes a communication connection, such as an SSH connection, between the management server 105 and the host server 110 (Block 220). For instance, the process 200 can involve establishing a link or tunnel, such as with an SSH client, between a random local port of the management server 105 and a random local port of the host server 110. That is, data written to a random local port of the management server 105 can be forwarded to the random remote port of the host server 110. In yet other embodiments of the invention, assigned or selected ports or other types of communication paths can be used or established.

At Block 225, the injection module 135 writes to the established port the required dependencies that are not available on the host server 110. For instance, the injection module 135 can search the library 140 of dependencies on the management server 105. In certain embodiments, the injection module 135 can utilize a cryptographic hash function or other like algorithm to identify a needed dependency in the library 140. For instance, in certain embodiments, the injection module 135 searches for a SHA-1 hash value of a dependency within the library 140 that matches the hash value of the requested dependency.

As the dependencies are transferred over the SSH connection, a receiver module on the host server 110 reads the transferred dependencies (Block 230). In certain embodiments, the receiver module comprises the script 160, such as a PYTHON script or other interpretive language script, that is echoed to the service console 133 from the management server 105. For instance, once the script 160 has been echoed to the service console 133, the executed script 160 can then bind to the particular local port designated to receive the transferred dependencies and write the received dependencies to a particular path on the host server 110 (e.g., in a "/tmp/GUID/" path, wherein GUID comprises a variable generated by the system). In certain further embodiments, the echoed script 160 can identify the particular port at which the dependencies are being received and/or the particular path to which the dependencies are to be written on the host server 110.

In yet other embodiments, the receiver module comprises a computer networking service, such as the UNIX NETCAT utility, to read the transferred dependency data.

Once the appropriate dependencies have been loaded to the service console 133 of the host server 110, or if at Block 215 the appropriate dependencies were already resident on the host server 110, the service console 133 executes the appropriate binaries to perform the commands associated with the requested job (Block 235). In certain embodiments, the script 160 notifies the service console 133 that the injected binaries are ready to be executed. In yet other embodiments, a command can be sent from the shell on the management server 105 to execute the binaries.

Once the requested job is complete, the SSH connection is terminated and the injected dependencies are removed from the service console 133 of the host server 110 (Block 240). For instance, a "remove" (e.g., rm) command can be issued to delete the dependency data from a defined repository path on the host server 110 (e.g., from the "/tmp/GUID/" path).

Although the injection process 200 has been described with reference to particular embodiments, it will be understood that variations can be made with respect to the process 200. For instance, in certain embodiments, rather than determining at Block 215 if all dependencies associated with a requested job are present on the host server 110, the process 200 can determine the availability of each dependency in real-time when the specific dependency is requested for performing the job.

Moreover, in other embodiments, Block 215 can be removed from the process 200 such that the management server 105 automatically injects to the host server 110 all the dependencies needed to perform the requested job. Such a process could be used when a user desires to maintain absolute control over the dependencies used in the performance of the job.

In yet other embodiments of the invention when it is desired to leave certain or all the injected dependencies on the host server 110, the process 200 can terminate after Block 235. For instance, in certain embodiments, select binary or data files may be used in a subsequent user session or job.

Figure 3:
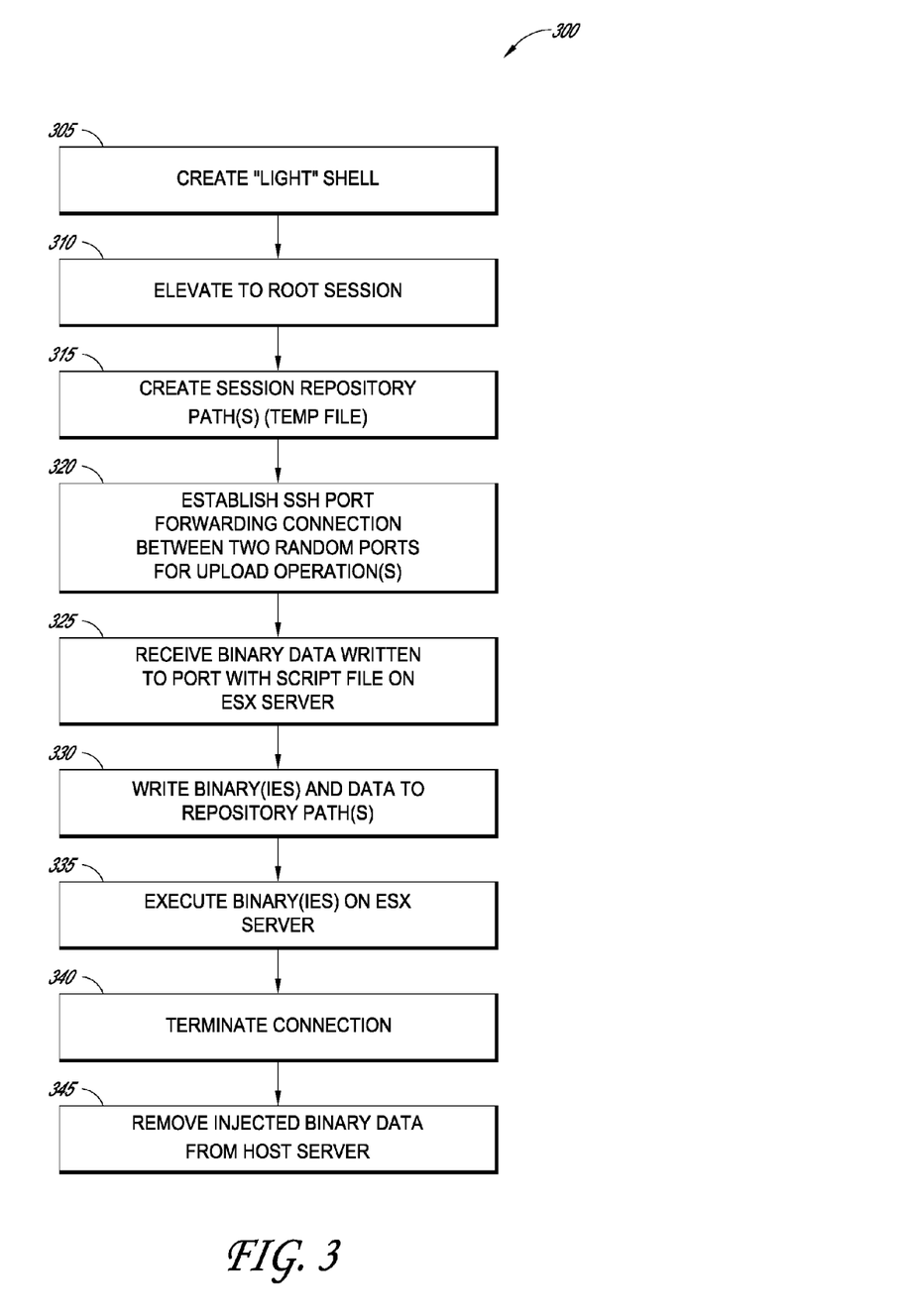
FIG. 3 illustrates a flowchart of an exemplary embodiment of a session-based binary injection process usable by the computing system of FIG. 1.

FIG. 3 illustrates a flowchart of a session-based binary injection process 300, according to certain embodiments of the invention. Like the injection process 200, the session-based binary injection process 300 allows for executables not resident on a host system to be received from a remote computing device and to be executed to manipulate virtual machine data. For exemplary purposes, the injection process 300 will be described with respect to the components of the virtual computing system 100 of FIG. 1.

Moreover, it will be understood that the injection process 300 parallels several of the functions of the injection process 200. Thus, blocks or functions that are described with respect to the injection process 200, will not be re-described in detail below. Rather, it will be understood that blocks described above can be incorporated within the injection process 300.

At Block 305, a session or shell is created through the management server 110. For instance, in certain embodiments, to initiate a session the user (or user computer) logs into the service console 133 and creates a shell. For example, in certain embodiments, a "light" shell is automatically created with limited or no command processing or completion, command editing or associated profile. In certain embodiments, the light shell is advantageously used to avoid long command lines or excess processing resources in performing the job. In yet other embodiments, Block 305 can comprise creating other types of sessions that allow for the execution of commands.

Following Block 305, the user session is preferably elevated to a "root" session (Block 310), such as through a su UNIX command via the shell interface. In certain embodiments, elevating user permissions advantageously allows for access to all required operations on the host server 110 during the execution of the binaries. In yet other embodiments, the process 300 can skip Block 315 when a "root" session in not required. For example, in other embodiments, permissions for needed files can be appropriately set such the user has access thereto.

At Block 315, the process 300 creates one or more root repository path(s) on the service console 133 of the host server 110 to receive injected binaries and data created in response to execution of the binaries. In certain embodiments, the repository path(s) facilitate access to and/or removal of the session data once the binaries are executed and the operating tasks are complete.

At Block 320, the process 300 initiates the upload operation on the needed binaries. In certain embodiments, this operation includes establishing an SSH port forwarding connection between the management server 105 and the host server 110, as discussed above. The selected binary data is then written to a local port of the management server 105 and read by a receiver (e.g., script 160) on the service console 133 (Block 325). As discussed above, in certain embodiments, the two ports can comprise local ports of the management server 105 and the host server 110.

Once the binary(ies) are loaded to the repository path(s) on the service console 133 (Block 330), the binaries are then executed to perform the desired task(s) (Block 335). In certain embodiments, such execution of certain binaries can require the execution of additional or dependent binaries, such as other customized or generally available executable files, and/or the loading of one or more libraries.

Upon completion of the tasks, the process 300 terminates the connection (Block 340), and all the data stored in the repository path(s) are removed (Block 345). It will be understood, however, from the disclosure herein that the immediate termination of the shell and/or session is not required with the completion of the execution of the binaries. Rather, in certain embodiments, the shell and/or session can be terminated at any time after the binaries are executed on the host computing device and/or the injected binaries can be left on the service console 133 for later use in other sessions.

Although the process 300 has been described with reference to particular arrangements, other embodiments can include more or fewer states than those described above. For example, in certain embodiments, the process 300 can further include, prior to Block 320, determining if a particular binary or command is already resident on the host server 110. If so, the process 300 can bypass injecting the particular binary or command from the management server 105 to the host server 110.

In certain embodiments, the injection processes 200 and 300 can be used to perform a plurality of different functions utilized in backup, replication or other storage of data in a virtual computing environment. The following provides an example of a customized compression task usable by a backup tool in a virtual computing environment having a host server using a service console and/or shell for remote communication. In particular, the disclosure provides an example of an abstraction of the framework of an SSH adapter in the disclosed injection systems that involves catting a file and compressing the file to be archived.

A single command can be represented by (n) individual atomic commands piped together in a shell-type session using UNIX pipes (e.g., cat file|vzip >file.vzc). Every command can be piped together in .NET via a library in a similar manner (e.g., ShellCommandCat|ShellCommandVzip >"file.vzc"). These components are then added to a collection of dependencies required to execute the command passed into the "Execute" method in the SSH Adapter type. In the example given, a ShellCommand could be built called "commandline" and set equal to ShellCommandCat|ShellCommandVzCompress. The commandline command is then passed along with a redirector to SshAdapter.Execute(commandLine >'file.vzc'). In certain embodiments, the pipe operator in C# is also overloaded to perform the behavior described.

In yet other embodiments, other types of internet protocol communications (IPC) can be used to pipe data between two locations. For instance, in a WINDOWS environment, dependencies could be injected using common internet file system (CIFS) processes to copy the dependencies, after which appropriate arguments (e.g., using WINDOWS management instrumentation (WMI), remote procedure calls (RPCs) and/or custom agents) would be used to execute the dependencies.

The following provides exemplary algorithm pseudo-code usable according to embodiments of the invention to perform an injection process. For instance, the following pseudo-code relates to a method of executing a command and/or job on the VMWARE ESX service console. The method comprises, for each component in the collection of components for the command(s):

1) Obtain a list of system dependencies (e.g., commands that already exist on the host system) and custom dependencies for a given component;
2) For each system dependency, create a mapping of a command alias to the command. In certain embodiments, this mapping includes generating a new GUID for each system dependency;
3) For each custom dependency (e.g., a created executable file):
   a) Obtain the binary path for the custom dependency, and
   b) If the session repository path (e.g., "/tmp/custom_binary/(New Guid)") does not already contain the executable with the SHA-1 hash for the given dependency:
      i) Set the target path for the binary to be (New GUID).bin within the repository path,
      ii) Upload the binary to the target path, and
      iii) Place the binary path in a map of SHA-1 to the target path;
4) Build a command-line string based on the mappings for both custom and system dependencies;
5) Issue the command in the shell or session on the VMWARE ESX console; and
6) Await a return to prompt (e.g., data returned on the SSH connection matches prompt regular expression pattern).

Although embodiments of the invention have been described above with respect to particular configurations, it will be understood from the disclosure herein that alternative configurations and/or components can be used within the scope of the inventions. For instance, instead of utilizing an SSH port forwarding connection to inject dependencies from a management server to a service console of a host server, other types of network communication protocol can be used. For instance, raw data can be alternatively sent directly between sockets without a higher level protocol, such as though secure file transfer protocol (SFTP) or the like.

Furthermore, in certain embodiments, the systems and methods described herein can advantageously be implemented using computer software, hardware, firmware, or any combination of software, hardware, and firmware. In one embodiment, the system is implemented as a number of software modules that comprise computer executable code for performing the functions described herein. In certain embodiments, the computer-executable code is executed on one or more general purpose computers. However, a skilled artisan will appreciate, in light of this disclosure, that any module that can be implemented using software to be executed on a general purpose computer can also be implemented using a different combination of hardware, software or firmware. For example, such a module can be implemented completely in hardware using a combination of integrated circuits. Alternatively or additionally, such a module can be implemented completely or partially using specialized computers designed to perform the particular functions described herein rather than by general purpose computers.

Moreover, certain embodiments of the invention are described with reference to methods, apparatus (systems) and computer program products that can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the acts specified herein to transform data from a first state to a second state.

These computer program instructions can be stored in a computer-readable memory that can direct a computer or other programmable data processing apparatus to operate in a particular manner, such that the instructions stored in the computer-readable memory produce an article of manufacture including instruction means which implement the acts specified herein.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the acts specified herein.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for performing one or more operations on virtual machine data, the method comprising:
   receiving with a management server a request to perform a backup operation on data of one or more virtual machines hosted by a host virtual machine server that is configured to host one or more virtual machines associated with a hypervisor layer, the host virtual machine server having a service console associated therewith that administers the one or more virtual machines, the host virtual machine server being remote to the management server, the management server and the host virtual machine server comprising computer hardware;
   identifying a plurality of dependencies comprising binary code associated with the requested backup operation of the data on the one or more virtual machines;
   searching the host virtual machine server to identify a first group of dependencies comprising one or more of the plurality of dependencies that are available on the host virtual machine server, and a second group of dependencies comprising one or more of the plurality of dependencies that are not available on the host virtual machine server;
   for the second group of dependencies that are not available on the host virtual machine server, injecting the second group of dependencies over a port forwarding connection from the management server to the service console of the host virtual machine server;
   echoing a script file from the management server to the host virtual machine server prior to said injecting the second group of dependencies over the port forwarding connection from the management server to the service console of the host virtual machine server, the script file being configured to bind to a local port of the host virtual machine server to receive the injected second group of dependencies;
   executing using the service console to execute in the hypervisor layer of the host virtual machine server the first and second groups of dependencies to perform the requested backup operation on the virtual machine data, such that said executing is performed without installing an agent or a daemon in the service console of the host virtual machine server; and
   following said executing, retaining the first group of dependencies at the host virtual machine server and removing the injected second group of dependencies from the service console of the host server.

2. The method of claim 1, wherein the port forwarding connection comprises a secure shell (SSH) connection.

3. The method of claim 1, wherein the script file is configured to write the injected second group of dependencies to a designated path on the host server.

4. The method of claim 1, wherein the injected second group of dependencies comprises a plurality of executable files.

5. The method of claim 4, wherein the at least one of the injected second group of dependencies comprises at least one of the plurality of executable files.

6. The method of claim 4, wherein the injected second group of dependencies comprises at least a plurality of data files.

7. The method of claim 1, comprising establishing a shell connection with the host virtual machine server via the management server.

8. A system for performing one or more operations in a virtual computing environment, the system comprising:
- a management server in network communication with a remote server hosting at least one virtual machine, the management server and the host remote server comprising computer hardware, wherein the remote server is configured to host the at least one virtual machine with a hypervisor layer, the remote server having a service console associated therewith that administers the one or more virtual machines, the management server further comprising:
  - a library comprising a plurality of dependencies, the plurality of dependencies comprising at least one binary file, and
  - an injection module configured to identify select ones of the plurality of dependencies that are associated with performing a backup operation on at least one of virtual machine data and the hypervisor layer, the injection module being further configured to:
    - initiate a communication session between the management server and the remote server,
    - search the remote server to identify a first group of dependencies comprising one or more of the plurality of dependencies that are available on the remote server, and a second group of dependencies comprising one or more of the plurality of dependencies that are not available on the remote server;
    - for the second group of dependencies that are not available on the remote server, inject the second group dependencies over a network connection to the service console of the remote server,
    - echo a script file from the management server to the remote server prior to the injection of the second group of dependencies over the network connection to the remote server, the script file configured to bind to a port of the remote server to receive the injected second group of dependencies,
    - issue a first command to the service console to execute on the remote server the first group of dependencies and the injected second group of dependencies to perform the backup operation, wherein said execution of the injected second group of dependencies is performed without installing an agent or a daemon on the remote server, and
    - issue a second command to terminate the session; and
    - retain the first group of dependencies at the remote server and remove from the remote server the injected second group of dependencies such that none of the injected second group of dependencies remains on the remote server following said termination of the session.

9. The system of claim 8, wherein the infected second group of dependencies comprise a plurality of binary files.

10. The system of claim 8, wherein the network connection comprises a secure shell (SSH) connection.

11. The system of claim 8, wherein the management server further comprises a shell interface configured to receive user commands associated with initiation of the session.

12. The system of claim 8, wherein the backup operation backs up at least a portion of the virtual machine data.

13. The system of claim 8, wherein the backup operation comprises a compression operation on the virtual machine data.

* * * * *